(12) United States Patent
Song et al.

(10) Patent No.: US 10,372,766 B2
(45) Date of Patent: Aug. 6, 2019

(54) METHOD AND SYSTEM FOR GENERATING A VIRTUAL THING FOR A MACHINE-TO-MACHINE APPLICATION AND A METHOD AND SYSTEM FOR PROVIDING A RESULT OF A VIRTUAL THING TO A MACHINE-TO-MACHINE APPLICATION

(71) Applicant: NEC EUROPE LTD., Heidelberg (DE)

(72) Inventors: JaeSeung Song, Seongnam-si (KR);
Joerg Swetina, Schriesheim (DE);
Ernoe Kovacs, Stuttgart (DE);
Apostolos Papageorgiou, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 592 days.

(21) Appl. No.: 14/767,917

(22) PCT Filed: Feb. 18, 2014

(86) PCT No.: PCT/EP2014/053115
§ 371 (c)(1),
(2) Date: Aug. 14, 2015

(87) PCT Pub. No.: WO2014/125119
PCT Pub. Date: Aug. 21, 2014

(65) Prior Publication Data
US 2015/0370900 A1    Dec. 24, 2015

(30) Foreign Application Priority Data
Feb. 18, 2013 (EP) ..................................... 13155583

(51) Int. Cl.
*G06F 16/951* (2019.01)
*H04W 4/70* (2018.01)

(52) U.S. Cl.
CPC ............ *G06F 16/951* (2019.01); *H04W 4/70* (2018.02)

(58) Field of Classification Search
USPC .................................................. 707/770, 705
See application file for complete search history.

(56) References Cited

U.S. PATENT DOCUMENTS 8,296,409 B2 * 10/2012 Banerjee ............. H04L 65/1016
709/205
8,793,652 B2 * 7/2014 Berg ........................ G06F 8/71
717/121

(Continued)

OTHER PUBLICATIONS

Cuiting Huang et al: "A semantic enhanced service exposure model for a converged service environment", IEEE Communications Magazine, IEEE Service Center, Piscataway, US; vol. 50, No. 3, Mar. 1, 2012 (Mar. 1, 2012), pp. 32-40, XP011429622.

(Continued)

*Primary Examiner* — Cam Linh T Nguyen
(74) *Attorney, Agent, or Firm* — Leydig, Voit & Mayer, Ltd.

(57) ABSTRACT

A method generates a virtual thing for a machine-to-machine application of a machine-to-machine system. The system includes a management function, a mashup-manager and one or more database connected to the system. The database provides one or more member resources for the machine-to-machine applications. The management function sends a request for generating a virtual thing to the mashup-manager. The mashup-manager initiates the generation of the requested virtual thing based on the information provided in the request on at least one of the databases. The request for generating the virtual thing includes virtual thing generation information comprising: member resource information, a predefined query for collecting data from the member resource according to the member resource information and (Continued)

semantic logic information for performing logic on the collected data.

18 Claims, 4 Drawing Sheets

(56) References Cited

U.S. PATENT DOCUMENTS

| | | | | |
|---|---|---|---|---|
| 9,047,160 | B2* | 6/2015 | Adi | G06F 8/63 |
| 9,684,866 | B1* | 6/2017 | Todd, Jr. | G06N 5/02 |
| 2008/0222599 | A1* | 9/2008 | Nathan | G06F 8/315 |
| | | | | 717/107 |
| 2011/0016467 | A1* | 1/2011 | Kane | G06F 9/45558 |
| | | | | 718/1 |
| 2011/0131194 | A1* | 6/2011 | Ma | G06F 17/30899 |
| | | | | 707/705 |
| 2012/0189177 | A1* | 7/2012 | Oh | G06K 9/228 |
| | | | | 382/128 |
| 2013/0086578 | A1* | 4/2013 | Eilam | G06F 9/45558 |
| | | | | 718/1 |
| 2013/0212159 | A1* | 8/2013 | Vandikas | H04L 67/2819 |
| | | | | 709/203 |
| 2014/0336786 | A1* | 11/2014 | Asenjo | G05B 19/4185 |
| | | | | 700/17 |

OTHER PUBLICATIONS

Machine to Machine Communications (M2M); Study on Semantic support for M2M Data; TR_ 101_584_v050_Clean, ETSI DRAFT; TR_101_584_V050 CLEAN, European Telecommunications Standards Institute (ETSI), 650, vol. SmartM2M, No. V0.5.0, Dec. 7, 2012 (Dec. 7, 2012), pp. 1-36, XP014167435.

Ovidiu Vermesan et al: "Internet of Things Strategic Research Roadmap", Jan. 1, 2011 (Jan. 1, 2011), XP055062015, ISBN: 978-8-79-232967-7 Retrieved from Internet: URL: http://internet-of-things-research.eu/pdf/IoT_Cluster_Strategic_Research_Agenda_2011.pdf, p. 27.

France Telecom: "oneM2M-WI-0005-Abstraction_&_Semantics_Capability_Enablement-V12-1.DOC Work Item O0D3; 2013 oneM2M Partners Work Item Proposal Work Item Title: oneM2M Abstraction & Semantics Capability Enablement Document Number oneM2M-WI-0005-oneM2M-WI-0005-Abstraction_&_Semantics_Capability_Enablement-V1_2", Mar. 1, 2013 (Mar. 1, 2013), XP055117494, Retrieved from the Internet: URL: http://member.onem2m.org/Application/documentapp/downloadLatestRevision/?docId=1227, p. 21, line 536-line 551, figure 3.

* cited by examiner

METHOD AND SYSTEM FOR GENERATING A VIRTUAL THING FOR A MACHINE-TO-MACHINE APPLICATION AND A METHOD AND SYSTEM FOR PROVIDING A RESULT OF A VIRTUAL THING TO A MACHINE-TO-MACHINE APPLICATION

CROSS-REFERENCE TO PRIOR APPLICATIONS

This application is a U.S. National Phase application under 35 U.S.C. § 371 of International Application No. PCT/EP2014/053115, filed on Feb. 18, 2014, claiming priority to European Patent Application No. EP 13155583.1, filed on Feb. 18, 2013. The International Application was published in English on Aug. 21, 2014 as WO 2014/125119 under PCT Article 21 (2).

FIELD

The present invention relates to a method for generating a virtual thing for a machine-to-machine application of a machine-to-machine system.

The present invention further relates to a method for providing a result of a virtual thing to a machine-to-machine application of a machine-to-machine system, said system further comprising a local database and/or a database connected to said machine-to-machine system, wherein the one or more databases provides one or more member resources for machine-to-machine applications.

Even further the present invention relates to a system for generating a virtual thing for a machine-to-machine application.

Even further the present invention relates to a system for providing a result of a virtual thing to a machine-to-machine application, said system comprising said machine-to-machine application and a local database and/or a database connected to said machine-to-machine system, wherein the one or more databases provides one or more member resources for machine-to-machine applications.

BACKGROUND

Machine-to-machine applications or systems are gaining more and more importance nowadays leading to standards like ETSI M2M, oneM2M or the like. Conventional machine-to-machine systems such as specified by ETSI M2M provide well defined machine-to-machine resources. These machine-to-machine resources may be grouped statically, i.e. implemented in advance, with the knowledge which resources have to be grouped, to provide a machine-to-machine service to a machine-to-machine application with different resources.

One of the disadvantages is however, that these conventional machine-to-machine systems are very inflexible with regard to the use of machine-to-machine resources.

SUMMARY

In an embodiment, the present invention provides a method for generating a virtual thing for a machine-to-machine application of a machine-to-machine system. The system includes a management function, a mashup-manager and one or more database connected to the system. The database provides one or more member resources for the machine-to-machine applications. The management function sends a request for generating a virtual thing to the mashup-manager. The mashup-manager initiates the generation of the requested virtual thing based on the information provided in the request on at least one of the databases. The request for generating a virtual thing includes virtual thing generation information comprising: member resource information, a predefined query for collecting data from a member resource according to the member resource information and semantic logic information for performing logic on the collected data.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
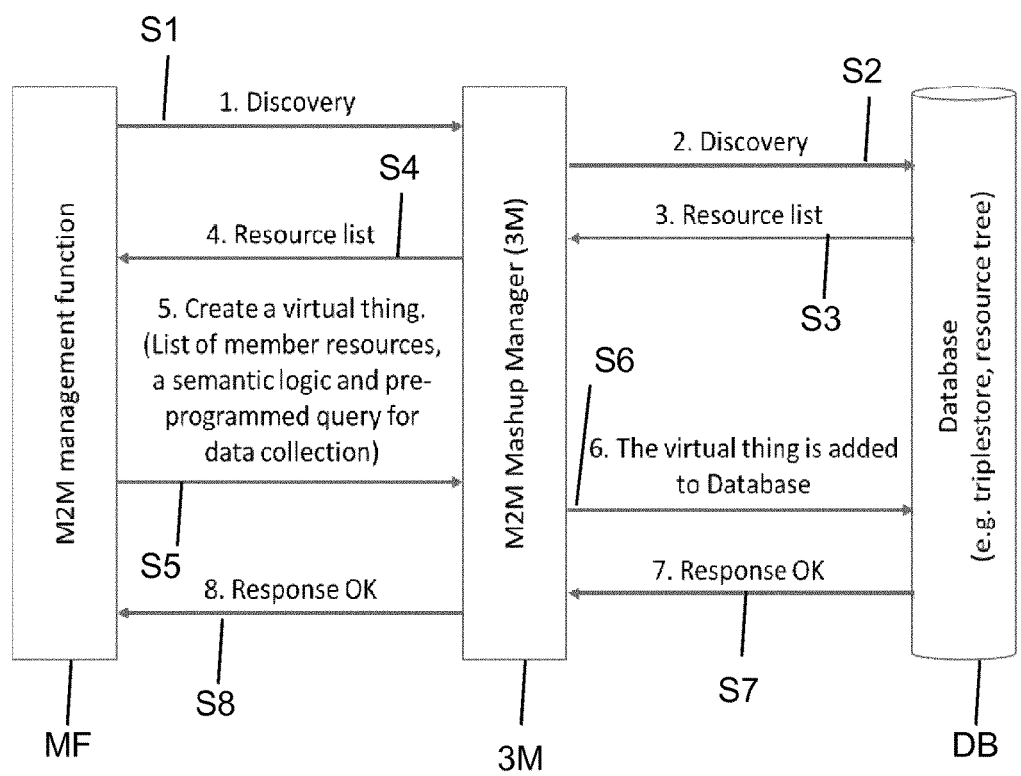
FIG. 1 shows a flow diagram of a method to a first embodiment of the present invention.

In an embodiment, the present invention provides enhanced flexibility while being easy to implement and cost-effective.

According to an embodiment of the present invention, a method for generating a virtual thing for a machine-to-machine application of a machine-to-machine system includes:
a management function,
a mashup-manager and
a local database and/or a database connected to said machine-to-machine system, wherein the one or more databases provides one or more member resources for machine-to-machine applications,
wherein
said management function sends a request for generating a virtual thing to said mashup-manager, wherein said mashup-manager initiates the generation of the requested virtual thing based on the information provided in the request on at least one of the databases, wherein the request for generating a virtual thing includes the following virtual thing generation information: member resource information, a predefined query for collecting data from a member resource according to said member resource information and semantic logic information for performing logic on data.

According to an embodiment of the present invention, a method for providing a result of a virtual thing to a machine-to-machine application of a machine-to-machine system is defined, said system further comprising a local database and/or a database connected to said machine-to-machine system, wherein the one or more databases provides one or more member resources for machine-to-machine applications.

According to an embodiment of the present invention, the method includes the steps of:
a) Providing a semantic query comprising semantic information by said application, b) Matching of a virtual thing to information of the semantic query, c) Instantiating the virtual thing comprising virtual thing information on said database, d) Collecting data by the virtual thing from member resources on said database, e) Applying the virtual thing information on the collected data by the virtual thing, and f) Providing the result of the virtual thing of step e) to said application.

According to an embodiment of the present invention, a system for generating a virtual thing for a machine-to-machine application includes:

a management unit, a mashup unit and a local database and/or a database connected to the machine-to-machine system, wherein the one or more databases provide one or more member resources for machine-to-machine applications, wherein the management unit is operable to send a request for generating a virtual thing to said mashup unit, wherein the mashup unit is operable to initiate the generation of the requested virtual thing based on the information provided in the request on at least one of the databases, wherein the request for generating a virtual thing includes the following virtual thing generation information: member resource information, a predefined query for collecting data from one or more member resources according to said member resource information, and semantic logic information for performing logic on data.

According to an embodiment of the present invention, a system for providing a result of a virtual thing to a machine-to-machine application is defined, said system comprising said machine-to-machine application and a local database and/or a database connected to said machine-to-machine system, wherein the one or more databases provides one or more member resources for machine-to-machine applications.

According to an embodiment of the present invention, the system includes:

a providing unit operable to provide a semantic query comprising semantic information by said application, a matching unit operable to match of a virtual thing to information of the semantic query, a generating unit operable to instantiate the virtual thing comprising virtual thing information on said databases, a collecting unit operable to collect data by the virtual thing from member resources on said one or more databases, logic operable to apply the virtual thing information on the collected data by the virtual thing, and a result unit operable to provide the result of the virtual thing of step e) to said application.

According to an embodiment of the present invention, it has been recognized that the generation of a virtual thing enables new and/or enhanced services to machine-to-machine applications.

According to an embodiment of the present invention, it has been further recognized that more than one existing member resource can be used by a virtual thing.

According to an embodiment of the present invention, it has been further recognized that by using predefined queries for collecting member resource information and/or collecting data a fast and efficient generation of a virtual thing is enabled.

According to an embodiment of the present invention, it has been further recognized that by providing semantic logic information for performing logic on data a result of a virtual thing can be provided in a flexible and efficient way to an application. The service logic describes inter alia how to handle collected data from the corresponding member resources.

Even further, according to an embodiment of the present invention, it has been recognized that an easy implementation is provided since conventional machine-to-machine commands can be used to communicate with a generated virtual thing. A virtual thing acts similar to a physical resource/thing like sensors or actuators and may provide intelligent data such as number of vehicles that passed during the last minutes or hours, average speed of vehicles, etc. The virtual thing can be searched and discovered in the machine-to-machine system in the same way as other machine-to-machine resources.

In other words, the present invention enables a semantic mashup by manipulating machine-to-machine resource data from one or more machine-to-machine resources to create a virtual thing in the machine-to-machine resource data and enables to apply a semantic logic or intelligent service logic to the collected data of the member resources of the generated virtual thing, such as calculating an average value and providing trends over certain periods or the like.

According to a preferred embodiment of the present invention, member resource information is provided in form of a list of available member resources upon performing a resource discovery to said management function by said database. This enables to provide the management function a list of machine-to-machine member resources satisfying the query together with corresponding generation information for the virtual thing from the requested member resource list. Therefore an optimized generation of the virtual thing further enhancing the flexibility is enabled, since for example by using discovery requests the database(s) can provide available member resources and after returning the list back to the management function, the management function can issue a request for generating the virtual thing with selected member resources which are then well defined and located.

According to a further preferred embodiment of the present invention, member resource information is provided in form of a pre-programmed query for collecting member resources at runtime. This enables a dynamic virtual mashup registration of virtual things without having to perform discovery requests separately, thus reducing communication between the machine-to-machine application and the mashup-manager.

According to a further preferred embodiment of the present invention, the generation of a virtual thing is acknowledged to the management function. This enables a very reliable generation of a virtual thing since successful generation is acknowledged so that access attempts to a virtual thing which was not generated properly are avoided.

According to a further preferred embodiment of the present invention, the generated virtual thing is announced and/or provided discoverable for a machine-to-machine application. This allows that a generated virtual thing can be easily accessed by other machine-to-machine applications. For example, if the generated virtual thing is announced to a machine-to-machine application, the machine-to-machine application does now know the existence of a virtual thing and can access it if desired. If the virtual thing is provided discoverable, then a machine-to-machine application may find the generated virtual thing and can access it without having to create the virtual thing. Therefore an efficient way to access a generated virtual thing is provided.

According to a further preferred embodiment of the present invention, a virtual thing is cached, preferably dependent on a request frequency of the virtual thing. By caching the virtual thing, a faster access to the virtual thing can be provided since for example the virtual thing can be cached in the mashup manager handling a corresponding request directly. Caching can be performed dependent on a request frequency for the virtual thing: For example if a certain threshold for the number of requests within a predetermined time period is exceeded, the virtual thing is cached for a certain time-period. Preferably a time-to-life value is assigned to the cached virtual thing to free its resources when the number of requests falls below another threshold.

According to a further preferred embodiment of the present invention, for performing step e) a semantic description is extracted from the virtual thing information and analysed and service logic information are determined based on said analyzed virtual thing information for applying on the collected data. By analyzing the semantic query service logic in the semantic description of virtual thing can be determined and applied efficiently on collected data.

According to another preferred embodiment of the present invention, the semantic query is analyzed with regard to a matching of conditions included in the semantic query with one or more possible implementations of the virtual thing. The analysis of the semantic query enables to precisely determine the conditions for the implementation. For example conditions like "single" and "virtual" have to be precisely defined to instantiate a virtual thing. Different specifications of the semantic description of e.g. "average" or the like can be implemented in a virtual thing. For example when semantically querying "averaging temperature data" a virtual thing could specify "averaging" as the calculation of the mean of X sensor reading while another virtual thing may include estimation functions or any other complex logic. Thus the principle of "logic customization" can be provided.

According to a further preferred embodiment of the present invention, one or more pre-programmed queries are performed on the one or more databases upon receiving a request matching a virtual thing, wherein results of the performed one or more queries are provided to the machine-to-machine application. This enhances the flexibility as well as enables a fast provision of results to machine-to-machine applications. For example when the database is operable to execute a query the database can—upon receiving a request for virtual thing—further execute the pre-programmed query/queries within the database and return the calculated result to the machine-to-machine application.

According to a further preferred embodiment of the present invention, for performing step c) one or more member resources are assigned to the virtual thing dynamically. This allows to further enhance the flexibility, since member resources are dynamically assigned for example at runtime to the virtual thing.

According to a further preferred embodiment of the present invention, a select query is used to select member resources of the virtual thing. For example that means that the virtual thing may not have a list of its member resources but may have a pre-programmed SPARQL select query. This query is then used for selecting member resources at run time preferably. When the virtual thing then receives a query or a command it first sends the SPARQL query and prepares a list of member resources. The virtual thing then may send subqueries to these member resources to collect desired values, such as temperature, etc. The collected values are then manipulated, for example based on a given service logic and returned to the machine-to-machine application.

According to a further preferred embodiment of the present invention, at least steps d)-f) are performed periodically and/or on demand. In the case of periodic collection, the virtual thing may have been registered to the machine-to-machine system and the virtual thing then periodically executes a pre-defined query and updates the results in its local storage. This cached results are then returned when the virtual thing receives a request from a machine-to-machine application. In this case for example the interval of executing the query has to be defined when the virtual thing is created. In case of performing steps d)-f) on demand a virtual thing may not manage any cache information. When the virtual thing receives the request from a machine-to-machine application it executes for example pre-defined queries and calculates results. These results calculated on demand are then returned to the machine-to-machine application.

According to a further preferred embodiment of the present invention, the member resources are selected from a local database and alternatively or additionally from one or more remote databases in case that no member resources are found in the local database. For example when member resources are discovered by a machine-to-machine management function and if no member resources are returned from a targeted database, a machine-to-machine semantic engine can extend the discovery to other remote databases, for example neighbor NSCL or GSCL.

According to a further preferred embodiment of the present invention, at least steps d)-f) are performed based on a subscribe/notify procedure. This reduces required communication resources: Only when a condition is matched for a calculated result the result is provided to the application. The information collection via a subscribe/notify mechanism may work as follows: An issuer, e.g. an M2M application, sends a query to the virtual thing and requests that this query is periodically re-calculated for a given time. During that time, whenever a result is calculated that matches a condition that was specified by the issuer, e.g. the result is different to the previous result, the virtual thing returns the result to the issuer.

FIG. 1 shows a flow diagram of a method to a first embodiment of the present invention.

In FIG. 1, a procedure for static virtual mashup registration is shown.

Static virtual mashup registration means, that when a new virtual thing is registered to a machine-to-machine system, a list of member resources is stored preferably as an attribute with a virtual thing.

In a first step S1, a machine-to-machine management function MF sends a discovery request to decide machine-to-machine member resources to a machine-to-machine mashup manager 3M In a second step S2, the machine-to-machine mashup-manager 3M sends a received discovery request to a database DB.

In a third step S3, the database DB, for a example a triple store or a resource-tree like database, performs the requested discovery and sends a corresponding resource list back to the machine-to-machine mashup-manager 3M. Therefore the machine-to-machine mashup-manager 3M receives an answer in form of a list of machine-to-machine resources satisfying the discovery request.

In a fourth step S4, the resource list, i.e. the results are delivered to the machine-to-machine management function MF.

In a fifth step S5, based on an administrator's decision, the machine-to-machine management function MF sends a request for creating a new virtual thing. This request includes a list of member resources, a semantic logic and a pre-programmed query for collecting data from the member resources of the list.

In a sixth step S6, the machine-to-machine mashup-manager 3M creates a virtual thing based on the received information from the machine-to-machine management function MF addressed in the previous step S5 and initiates creating it in the database DB, so that the virtual thing is added to the database DB.

In a seventh step S7, the database DB sends an acknowledgement response, for example an "O.k.", after successfully creating the requested virtual thing back to the machine-to-machine mashup-manager 3M.

In an eighth step S8, the machine-to-machine mashup-manager 3M forwards the received acknowledgement response from the database DB to the machine-to-machine management function MF.

Figure 2:
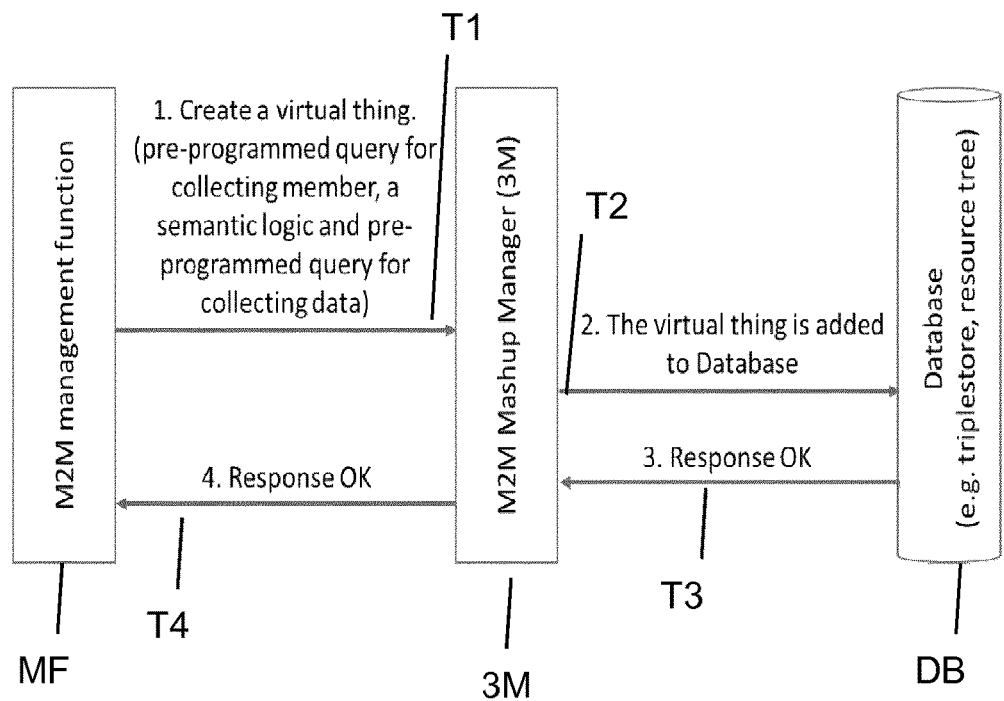
FIG. 2 shows a flow diagram of a method according to a second embodiment of the present invention.

FIG. 2 shows a flow diagram of a method according to a second embodiment of the present invention.

In FIG. 2, a procedure for dynamical virtual mashup registration is shown.

Dynamical virtual mashup registration uses a pre-programmed query collecting member resources dynamically at a time of receiving a request from the virtual thing.

In a first step T1, and since member resources need to be collected at runtime, a machine-to-machine management function MF sends a request for creating a virtual thing directly to a machine-to-machine mashup-manager 3M without sending a discovery request. In this case the message, i.e. the request for creating the virtual thing includes the following information:
- a pre-programmed query for collecting member resources at runtime, for example "Find numbers of cars in a specific place",
- a semantic logic, for example "calculating number of resources", averaging the measured temperature from member resources" or the like,
- a pre-programmed query for collecting data from the collected member resources, for example "get the temperature".

In a second step T2, the machine-to-machine mashup-manager 3M creates a virtual thing based on the received information addressed in the previous step T1 and initiates adding of the virtual thing to a database DB.

In a third step T3, after successfully creating the requested virtual thing, the database DB sends a corresponding acknowledgement response message, for example an "O.k."-message back to the machine-to-machine mashup-manager 3M.

In a fourth step T4, the machine-to-machine mashup-manager 3M forwards the received acknowledgement response message to the machine-to-machine management function MF.

Once a virtual thing or virtual thing is successfully created on a database DB it behaves as any other normal or conventional machine-to-machine resource. This means that the virtual thing can be announced and/or discovered by other machine-to-machine applications and can answer a query.

Figure 3:
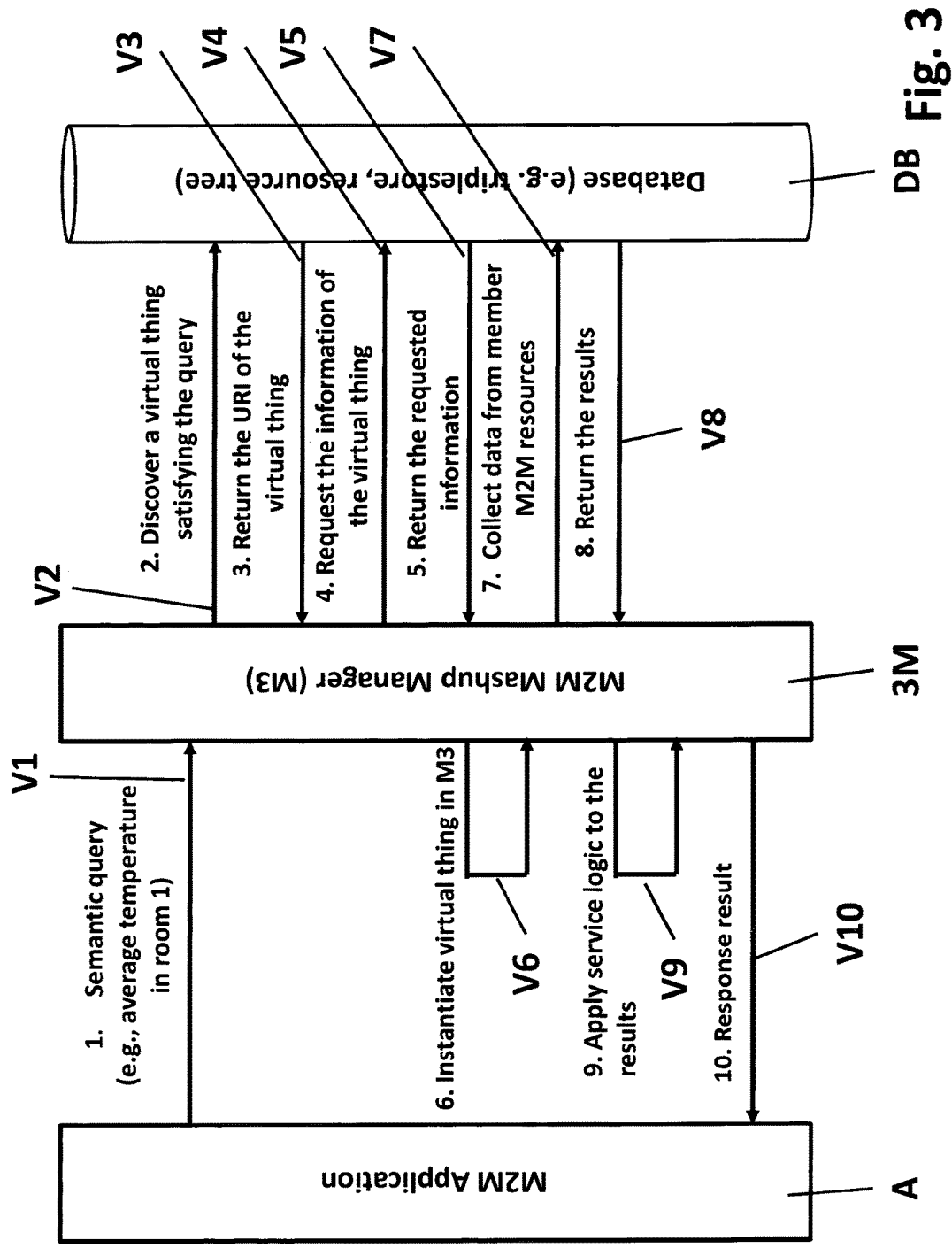
FIG. 3 shows a flow diagram of a method according to a third embodiment of the present invention.

FIG. 3 shows a flow diagram of a method according to a third embodiment of the present invention.

In FIG. 3, a semantic virtual mashup procedure is shown.

In a first step V1, a machine-to-machine application A sends a semantic query to a machine-to-machine system comprising a machine-to-machine mashup-manager 3M and a database DB connected to it. The semantic query may for example be "get the temperature of room No. 1".

In a second step V2, the machine-to-machine mashup-manager 3M handles the received semantic query like a normal semantic query, so that a discovery request is sent to the database DB, for example SCLs for ETSI M2M or triplestore for semantic machine-to-machine systems using triple-store.

In a third step V3, the database DB returns an address/locator like a universal resource identification URI of a virtual thing matching the semantic query, for example here by providing the temperature of room No. 1, back to the machine-to-machine mashup-manager 3M.

In a fourth step V4, the machine-to-machine mashup-manager 3M sends a request to the database DB to retrieve the information of the virtual thing, i.e. comprising service logic, mashup type, i.e. either static or dynamic and pre-programmed queries.

In a fifth step V5, the database DB returns the requested information back to the machine-to-machine mashup-manager 3M.

In a sixth step V6, the machine-to-machine mashup-manager 3M creates the virtual thing in the machine-to-machine mashup-manager 3M, i.e. instantiates it. For a virtual thing being frequently requested, it can be cached in the machine-to-machine mashup-manager 3M which handles then further requests directly.

In a seventh step V7, the virtual thing at the machine-to-machine mashup-manager 3M collects required data from its member resources using the pre-programmed query, i.e. collects data from the member resources on the database DB.

In an eighth step V8, the database DB returns the results according to the pre-programmed query from the member resources back to the machine-to-machine mashup-manager 3M.

In a ninth step V9, the virtual thing on the machine-to-machine mashup manager 3M applies its service logic to the received data and calculates the results. The service logic is described in a semantic description of a virtual thing. In particular this enables for case-specific aggregation or enrichment techniques that they are not necessarily specified by the machine-to-machine application A, since only the—possibly dynamically—retrieved virtual thing knows the exact actions that must be performed on the data of its member resources.

In a tenth step V10, the machine-to-machine mashup-manager 3M returns the results to the machine-to-machine application A.

Figure 4:
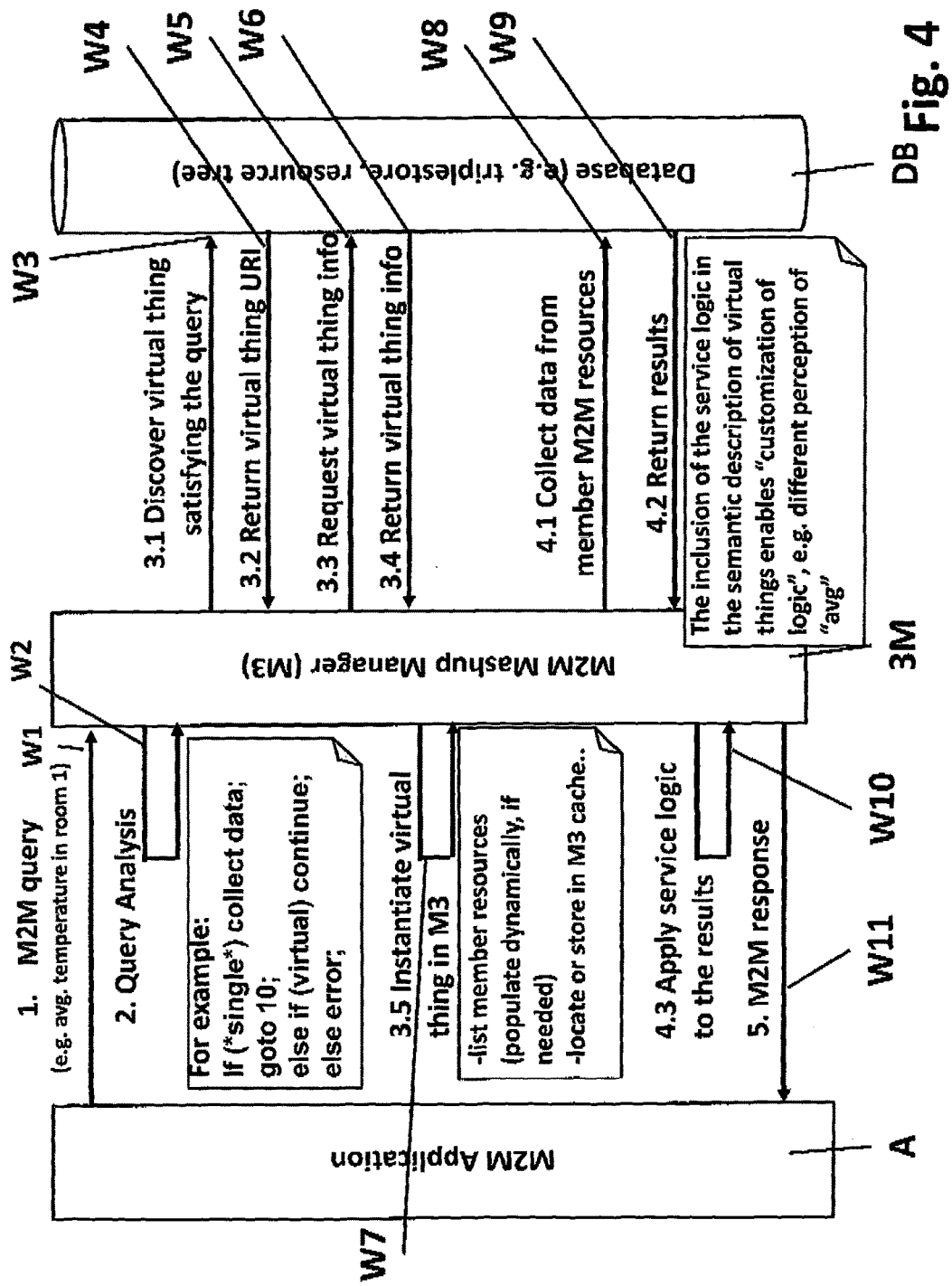
FIG. 4 shows a flow diagram of a method according to a fourth embodiment of the present invention.

FIG. 4 shows a flow diagram of a method according to a fourth embodiment of the present invention.

In FIG. 4, an alternative semantic virtual mashup procedure is shown:

In a first step W1, a machine-to-machine query is sent from a machine-to-machine application A to a machine-to-machine mashup-manager 3M. For example a machine-to-machine application A sends a query with special care for handling of virtual things. The same query may be directed to a local database DB in one system or be handled by virtual thing in another database DB. The machine-to-machine query in FIG. 4 comprises for example the "average temperature in room No. 1" as step V1 in FIG. 3.

In a second step W2, a query analysis is performed by the machine-to-machine mashup-manager 3M on the received machine-to-machine query. For example in FIG. 4, a pseudo code is shown which simply indicates what this query analysis is about. For example there are many possible implementations of the conditions "single" and "virtual". Although the exact conditions are up to the implementation, analysis preferably is to be performed here and a prior registration of the virtual things as described in FIG. 1 and/or FIG. 2 is required in order to be able to implement a real instantiation of the shown pseudo code.

The next steps W3-W7 correspond in general to the steps V2-V6 of FIG. 3, and describe the following, in particular virtual resource discovery and virtual resource instatiation:

The virtual things can be found there where they have been stored during the registration. The machine-to-machine mashup-manager 3M handles this like a normal/conventional semantic query, so that it sends a discovery request to the machine-to-machine database DB, for example SCLs for ETSI M2M or triple store for similar semantic machine-to-machine systems, and a database DB returns the URI of virtual thing that it can provide, for example temperature measurements from room No. 1, possibly from many devices. The machine-to-machine mashup manager 3M sends a request to the database DB to retrieve the information of the virtual thing, preferably service logic, mashup type, i.e. either static or dynamic, and/or pre-programmed queries. The database DB returns the requested information and the machine-to-machine mashup-manager 3M can proceed to further actions by instantiating what it needs.

The steps W8 and W9 as well as the steps W10 and W11, correspond in general to the steps V7-V10 in FIG. 3, and describe the following, in particular data collection and processing:

The virtual thing at the machine-to-machine mashup-manager 3M collects the required data from the member resources using the pre-programmed query. When the database DB returns the results from member resources the virtual thing applies its service logic to the received data and calculates the final results. The service logic is described in the semantic description of the virtual thing. This enables for a case-specific aggregation or enrichment techniques that are not necessarily specified by the application A, preferably because only the—possibly dynamically—retrieved virtual thing knows the exact actions that are to be performed on the data of its member resources. For example when querying "averaging temperature data" a virtual thing could specify "averaging" as the calculation of the mean of X sensor reading while another virtual thing may include estimation functions or any other complex logic. Of course very different examples of this "logic customization" may be thought of/used. The virtual thing on the machine-to-machine mashup-manager 3M then returns the results to the requesting machine-to-machine application A.

If a virtual thing is frequently invoked by a machine-to-machine application the procedures retrieving the information of the virtual thing from the database DB and instantiating/creating the virtual thing in the machine-to-machine mashup-manager 3M are not required to be performed for each request from machine-to-machine applications A. In this case the machine-to-machine mashup-manager 3M can hold the instantiated/created virtual thing in a cache and use it whenever it receives a request for the virtual thing.

If the database like a triple store or tree-structured database DB has a capability to execute a query when receiving a request for a virtual thing, the database DB can further execute pre-programmed queries within the database DB and return the calculated results to a machine-to-machine application A.

Semantic mashup is a procedure manipulating machine-to-machine resource data from more than one machine-to-machine resources to create a virtual thing in a machine-to-machine system. Semantic mashup creates therefore a new virtual thing not only through aggregating more than one machine-to-machine resource data but also by applying intelligent service logic to collected data, such as calculating average value and providing trends of certain periods or the like.

As already mentioned and preferably with regard to FIG. 1, a static semantic mashup relates to member resources of a virtual thing that are statically determined by a machine-to-machine management application. When the virtual thing received a query or a command, for example, a query requesting an average value of its member resources, the virtual thing simply issues pre-programmed queries to its member resources and applies service logic to returned values. In this case the virtual thing calculates the average of the returned values.

Compared to the static mashup procedure described above and preferably with regard to FIG. 2, a dynamic semantic mashup determines its member resources dynamically. In particular the virtual thing does not have a list of its member resources but has e.g. pre-programmed SPARQL select query. This query is used for selecting its member resources at runtime. When the virtual thing receives a query or command it first sends the SPARQL select query and prepares a list of member resources. The virtual thing then sends subqueries to these member resources to collect desired values, such as temperature, etc. The collected values are then manipulated based on the given service logic followed by return to the corresponding requesting machine-to-machine application.

To collect information from a virtual thing periodic collection and/or on-demand runtime collection may be used: When a virtual thing has been registered to a machine-to-machine system, the virtual thing may periodically execute pre-defined queries and update the results in its local storage. These cached results are then returned when the virtual thing is received a request from machine-to-machine applications A. In this case the interval of executing the query may be defined when the virtual thing is created.

In contrast thereto, on-demand runtime collection requires the virtual thing that does not manage any cache information. When the virtual thing receives a request from the machine-to-machine application, it executes the pre-defined query or queries and calculates results. These results calculated on-demand are returned to the machine-to-machine application.

Even further, a virtual thing can select its member resources not only from its local database DB but also from remote databases. In particular when resources are discovered by a machine-to-machine management function and if no member resources are returned from the targeted database, the machine-to-machine semantic engine can extend the discovery to other remote databases such as neighbor NSCL or GSCL.

The present invention enables the creation or generation of a virtual thing enabling new machine-to-machine services to machine-to-machine applications, using more than one existing machine-to-machine service. Even further the present invention enables collection of member resources of a virtual thing by using pre-programmed queries stored in a virtual thing. Even further the present invention enables the use of pre-programmed queries stored in a virtual thing to collect data from its member resources.

Service logic according to the invention describes how to handle collected data from member resources. The virtual thing is enabled to be instantiated in a machine-to-machine mashup-manager 3M, performs data collection and returns the results to machine-to-machine applications. Further the present invention enables caching the located virtual thing in a machine-to-machine manager 3M local cache store and retrieving the virtual thing from the cache, not from the database. Even further the present invention enables dynamic or static collection of member resources of a virtual thing.

In summary, the present invention enables dynamic and static creation of a virtual thing with mashup information. Further the present invention enables a virtual thing providing a new service using more than one existing machine-to-machine services being able to be accessed using normal or conventional machine-to-machine commands. Even further the present invention enables caching of an instantiated virtual thing in a machine-to-machine mashup-manager 3M to reduce duplicated message exchanges. One of the advantages of the present invention is that a framework is provided to create new machine-to-machine service using semantic information.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for generating a virtual thing for a machine-to-machine application of a machine-to-machine system, wherein the machine-to-machine system includes a management function, a mashup-manager and one or more databases including at least one of a local database and a database connected to the machine-to-machine system, wherein the one or more database provides one or more member resources for the machine-to-machine applications, the method comprising:
   sending, by the management function, a request for generating a virtual thing to the mashup-manager; and
   initiating, by the mashup-manager, the generation of the requested virtual thing based on the information provided in the request on at least one of the databases,
   wherein the request for generating the virtual thing includes virtual thing generation information comprising: member resource information, a predefined query for collecting data from one of the member resources according to the member resource information, and semantic logic information that requires the generated virtual thing to be configured to apply logic corresponding to the semantic logic information on the collected data.

2. The method according to claim 1, wherein the member resource information is provided as a list of available member resources upon performing a resource discovery to the management function by the at least one of the databases.

3. The method according to claim 1, wherein the member resource information is provided as a pre-programmed query for collecting member resources at runtime.

4. The method according to claim 1, wherein the generation of the virtual thing is acknowledged to the management function.

5. The method according to claim 1, wherein the generated virtual thing is announced to or provided as discoverable for the machine-to-machine application.

6. A method for providing a result of a virtual thing to a machine-to-machine application of a machine-to-machine system, wherein the machine-to-machine system comprises one or more databases including at least one of a local database and a database connected to the machine-to-machine system, wherein the one or more database provides one or more member resources for the machine-to-machine applications, the method comprising:
   a) providing a semantic query comprising semantic logic information by the machine-to-machine application,
   b) matching a virtual thing to information of the semantic query,
   c) instantiating the virtual thing comprising virtual thing information on at least one of the databases,
   d) collecting data by the virtual thing from the one or more member resources on the at least one of the databases,
   e) applying the virtual thing information on the collected data by the virtual thing, the virtual thing information corresponding to the semantic logic information, and
   f) providing a result of the virtual thing of step e) to the machine-to-machine application.

7. The method according to claim 6, wherein the virtual thing is cached.

8. The method according to claim 6, wherein for performing step e), a semantic description is extracted from the virtual thing information and analyzed, and service logic information are determined based on the analyzed virtual thing information for applying on the collected data.

9. The method according to claim 6, wherein the semantic query is analyzed with regard to a matching of conditions included in the semantic query with one or more possible implementations of virtual things.

10. The method according to claim 6, wherein one or more pre-programmed queries are performed on the one or more database upon receiving a request matching a virtual thing, wherein results of the performed one or more preprogrammed queries are provided to the machine-to-machine application.

11. The method according to claim 6, wherein for instantiating the virtual thing, one or more member resources are assigned to the virtual thing dynamically.

12. The method according to claim 11, wherein a select query is used to select member resources of the virtual thing.

13. The method according to claim 6, wherein at least steps d)-f) are performed periodically or on demand.

14. The method according to claim 6, wherein the member resources are selected from the local database or from one or more remote database in case that no member resources are found in the local database.

15. The method according to claim 6, wherein at least step d)-f) are performed based on a subscribe/notify procedure.

16. A system for generating a virtual thing for a machine-to-machine application, the system comprising:
   a management unit,
   a mashup unit and
   one or more databases including at least one of a local database and a database connected to a machine-to-machine system, wherein the one or more database provides one or more member resources for the machine-to-machine application,
   wherein the management unit is operable to send a request for generating a virtual thing to the mashup unit,
   wherein the mashup unit is operable to initiate the generation of the requested virtual thing based on the information provided in the request on at least one of the databases, and
   wherein the request for generating a virtual thing includes virtual thing generation information comprising: member resource information, a predefined query for collecting data from the one or more member resources according to the member resource information, and semantic logic information that requires the generated virtual thing to be configured to apply logic corresponding to the semantic logic information on the collected data.

17. A system for providing a result of a virtual thing to a machine-to-machine application, the system comprising the machine-to-machine application and one or more databases including at least one of a local database and a database connected to a machine-to-machine system, wherein the one or more database provides one or more member resources for the machine-to-machine application, the system comprising:
   a providing unit operable to provide a semantic query comprising semantic logic information by the machine-to-machine application,
   a matching unit operable to match the virtual thing to the semantic logic information of the semantic query,
   a generating unit operable to instantiate the virtual thing comprising virtual thing information on the one or more databases,
   a collecting unit operable to collect data by the virtual thing from the one or more member resources on the one or more databases,
   logic operable to apply the virtual thing information on the collected data by the virtual thing, the virtual thing information corresponding to the semantic logic information, and
   a result unit operable to provide the result of the virtual thing to the application.

18. The method according to claim 7, wherein the virtual thing is cached dependent on a request frequency of the virtual thing.

* * * * *